United States Patent
Hayashi et al.

(10) Patent No.: US 6,475,266 B2
(45) Date of Patent: Nov. 5, 2002

(54) EXHAUST GAS RECOVERY METHOD AND APPARATUS

(75) Inventors: Kenji Hayashi, Shizuoka-ken (JP); Junichi Nagata, Shizuoka-ken (JP); Shinichi Funabashi, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 43 days.

(21) Appl. No.: 09/809,222

(22) Filed: Mar. 16, 2001

(65) Prior Publication Data

US 2001/0022136 A1 Sep. 20, 2001

(30) Foreign Application Priority Data

Mar. 16, 2000 (JP) ........................................ 2000-074783

(51) Int. Cl.[7] .............................................. B01D 53/14
(52) U.S. Cl. ............................. 95/184; 62/625; 62/632; 95/188; 95/189; 95/190; 95/228; 95/237; 96/234
(58) Field of Search ............................. 46/234; 62/625, 62/632; 95/184, 188, 190, 206, 228, 237, 189, 205

(56) References Cited

U.S. PATENT DOCUMENTS

| | | | |
|---|---|---|---|
| 4,110,091 A | 8/1978 | Daeschler | 62/54 |
| 5,540,057 A | 7/1996 | Cheng | 62/625 |
| 5,634,355 A * | 6/1997 | Cheng et al. | |
| 5,897,690 A * | 4/1999 | McGrew | |
| 2001/0022136 A1 * | 9/2001 | Hayashi et al. | |
| 2002/0000096 A1 * | 1/2002 | Trembley et al. | |

FOREIGN PATENT DOCUMENTS

| DE | 31 49847 A1 | 7/1983 |
|---|---|---|
| EP | 0 818 231 A1 | 1/1998 |

* cited by examiner

*Primary Examiner*—Duane S. Smith
(74) *Attorney, Agent, or Firm*—Sughrue Mion, PLLC

(57) ABSTRACT

An exhaust gas recovery method and apparatus including: a first process in which volatile organic compound gas in exhaust gas from a exhaust gas discharging source is absorbed into water by a scrubber; a second process in which water including the volatile organic compound, which is obtained in the first process, is frozen and the volatile organic compound herein concentrated such that the water including the volatile organic compound is separated into water including a high concentration of the volatile organic compound, level of concentration being higher than that of the water including the volatile organic compound which is obtained in the first process, and ice; a third process in which cold of the ice obtained in the second process is used; and a fourth process in which the water including a high concentration of the volatile organic compound, which is obtained in the second process, is reused, is provided.

16 Claims, 1 Drawing Sheet

EXHAUST GAS RECOVERY METHOD AND APPARATUS

BACKGROUND OF THE INVENTION

1. Field of the Invention

The present invention relates to an exhaust gas recovery method and apparatus. In particular, the present invention relates to an exhaust gas recovery and reuse method and apparatus, in which a volatile organic compound, such as a solvent, in the exhaust gas is recovered and reused.

2. Description of the Related Art

A volatile organic compound gas, such as a solvent, is generated from a factory. It is preferable that the gas is recovered and reused. Various methods of recovering the solvent and the like are proposed. Absorbing a volatile organic compound by an adsorbent such as active carbon is generally known as a conventional method of recovering a volatile organic compound exhausted from a factory or the like. However, in this method, because some types of volatile organic compounds, for example, solvent gases, cannot be adsorbed by an adsorbent, they are released into the atmosphere. Namely, with respect to the some kinds of the volatile organic compounds, the adsorbent does not have removal ability. Also, there are cases in which, with respect to some types of volatile organic compounds, the deterioration rate of the active carbon is high. In such cases, a problem arises in that the cost for replacing the active carbon (running cost) becomes high.

Recovering the volatile organic compound gas by a scrubber is another generally known method. However, in a case where the volume of gas is large and the concentration of the volatile organic compound gas is small, a large amount of water for the scrubber is needed. In this case, because the amount of water for the scrubber is large, a large amount of waste water, which includes the volatile organic compound recovered from the scrubber, is generated. Therefore, many processes, in which the waste water is processed so as to recover the volatile organic compound therefrom, are needed. Accordingly, this method is not economical.

SUMMARY OF THE INVENTION

The present invention takes the facts mentioned above into consideration, and an object of the present invention is to provide an exhaust gas recovery method and apparatus therefor, in which a volatile organic compound, such as a solvent, in a large amount of exhaust gas, can be recovered efficiently and at a relatively low cost, and the recovered volatile organic compound can be reused.

Exhaust gas recovery methods of the present invention are:

(1) An exhaust gas recovery method comprising: a first process in which a volatile organic compound gas is absorbed by water; a second process in which water including the volatile organic compound, which is obtained in the first process, is frozen and concentrated such that the water including the volatile organic compound, which is obtained in the first process, is separated into water including a high concentration of the volatile organic compound, level of concentration being higher than that of the water including the volatile organic compound which is obtained in the first process, and ice; a third process in which cold of the ice obtained in the second process is used; and a fourth process in which the water including a high concentration of the volatile organic compound, which is obtained in the second process, is reused.

(2) An exhaust gas recovery method, according to (1), wherein the fourth process is a process in which the water including a high concentration of the volatile organic compound, which is obtained in the second process, is separated into the volatile organic compound; and water.

(3) An exhaust gas recovery method according to (2), further comprising: a fifth process in which the separated water obtained in the fourth process is supplied to the first process.

(4) An exhaust gas recovery method according to (2) or (3), further comprising: a sixth process in which the separated volatile organic compound obtained in the fourth process is supplied to a facility where the volatile organic compound is needed.

(5) An exhaust gas recovery method according to (1), (2), (3) or (4), further comprising: a seventh process in which water, which is generated due to the cold of the ice being used in the third process, is supplied to the first process.

(6) An exhaust gas recovery method according to (1), (2), (3), (4) or (5), wherein the volatile organic compound is an organic solvent.

(7) An exhaust gas recovery method, according to (1), (2), (3), (4), (5) or (6), wherein the volatile organic compound included in the water, which is generated due to the cold of the ice being used in the third process, is decomposed in a waste water processing facility.

In an exhaust gas recovery method of the present invention, in the first process, a volatile organic compound gas is absorbed by water. In the second process, when the water including the volatile organic compound, which is obtained from the first process, is frozen, the water becomes an ice composed of substantially pure water. In contrast, the volatile organic compound does not freeze, and is in a state of being dissolved in water. Accordingly, the concentration of the volatile organic compound in the water which is subjected to the second process becomes high. This water including the volatile organic compound in a high concentration is separated into water and the volatile organic compound in the fourth process. In the fourth process, because the concentration of the volatile organic compound in the water is high, the amount of the water which is subjected to this separating process is small, therefore, a low level of energy is needed for this separating process.

Exhaust gas recovery apparatuses of the present invention are:

(8) An exhaust gas recovery apparatus comprising: a first section in which a volatile organic compound gas is absorbed by water; a second section in which water including the volatile organic compound, which is obtained in the first section, is frozen and concentrated such that the water including the volatile organic compound, which is obtained in the first section, is separated into water including a high concentration of the volatile organic compound, level of concentration being higher than that of the water including the volatile organic compound which is obtained in the first section, and ice; a third section in which cold of the ice obtained in the second section is used; and a fourth section in which the water including a high concentration of the volatile organic compound, which is obtained in the second section, is reused.

(9) An exhaust gas recovery apparatus according to (8), wherein the first section is a scrubber.

(10) An exhaust gas recovery apparatus according to (8) or (9), wherein the fourth section is a distiller.

The exhaust gas recovery is preferably implemented by the exhaust gas recovery apparatus of the present invention. In particular, in a scrubber, the contact efficiency rate of the water drops or the water film contacting the volatile organic compound gas is high. Also, in a distiller device, the water and the volatile organic compound are separated efficiently, by use of the difference between the boiling point of water and the boiling point of the solvent.

DESCRIPTION OF THE PREFERRED EMBODIMENT

Figure 1:
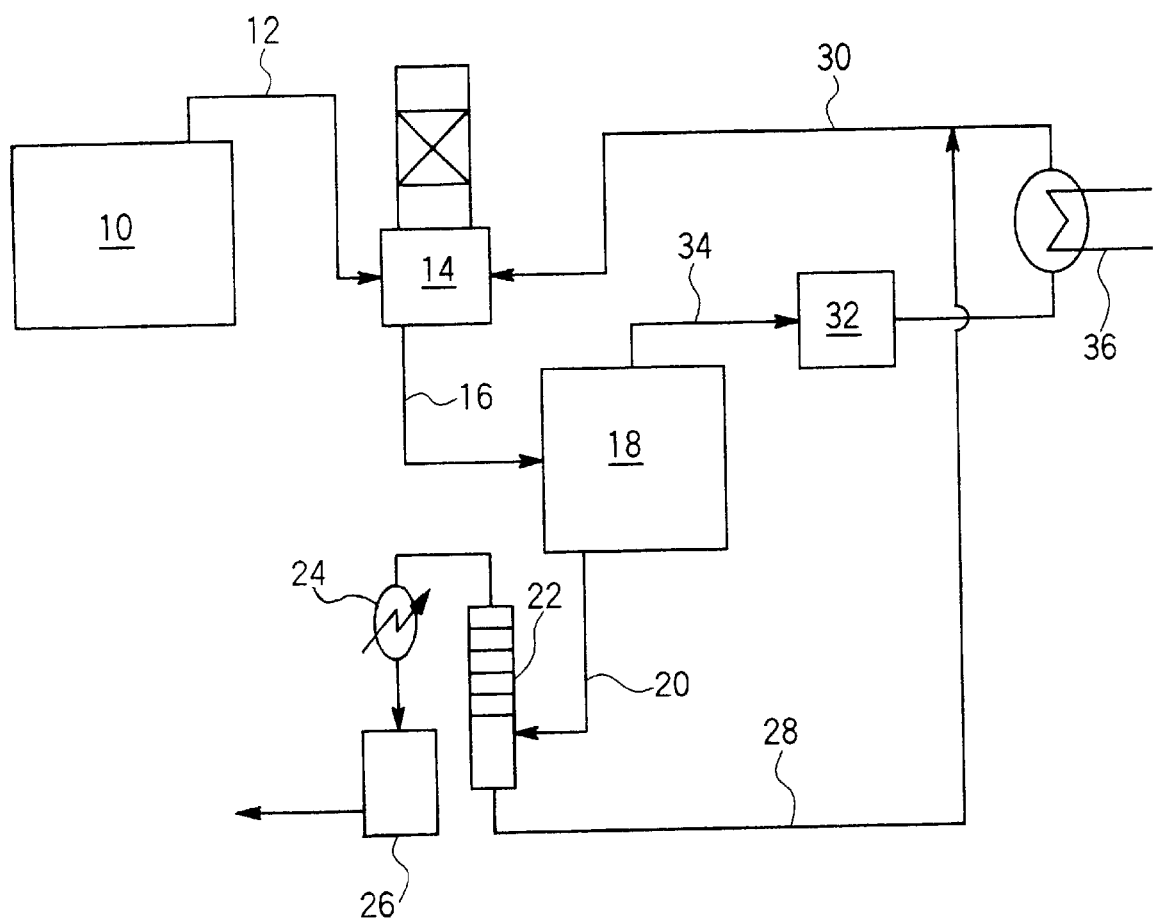
FIG. 1 is a schematic structural view illustrating a preferred embodiment of an exhaust gas recovery device of the present invention.

A description will be given below of a preferred embodiment of the present invention.

Exhaust Gas Recovery Method (First Process)

The first process is a process in which a volatile organic compound gas is absorbed by water. Here, a water soluble organic solvent is used as the volatile organic compound. Examples of the water soluble organic solvent are: alcohols such as methanol, ethanol, n-propanol, and isopropanol; polyhydric alcohols such as thylene glycol; ketones such as acetone, methyl acetone, methyl ethyl ketone, cyclohexanone; esters such as formic methyl, formic ethyl, methyl acetate, ethyl acetate, lactic acid methyl; and the like.

These volatile organic compounds are included in exhaust gas in a gaseous state in various types of factories. The volatile organic compound included in the exhaust gas can be absorbed into water by the exhaust gas being made to contact the water efficiently. In the first process, a method in which the exhaust gas is passed through water may be applied. However, it is preferable that a method using a scrubber is applied. The scrubber has the function of capturing the volatile organic compound gas included in the exhaust gas by water droplets or a water film. A spray tower, a cyclone scrubber, a venturi scrubber, a taizen washer, or another device can be used as the scrubber. In this process, a spray tower is preferable from the standpoint that the volatile organic compound gas in the exhaust gas can be captured efficiently and absorbed into water.

(Second Process)

The second process is a process in which water including a volatile organic compound is frozen such that the volatile organic compound contained therein is concentrated. In this way, the water including the volatile organic compound is separated into water including the volatile organic compound in a highly concentrated state and, ice. The following are known as methods in which the water including the volatile organic compound is frozen and the volatile organic compound concentrated: a method in which a cooling plate is used and ice is formed in the cooling plate, a method in which ice grains are used, and a method in which pressure is applied and reduced. In the present invention, any of these methods can be applied. In the second process, the water including the volatile organic compound is frozen and the volatile organic compound concentrated, so as to be separated into water including the volatile organic compound in a highly concentrated state and ice composed of substantially pure water. The ice composed of substantially pure water is in a state of ice crystal grains, ice grain aggregates, or the like.

(Third Process)

The third process is a process in which a cold of the ice obtained in the second process is used. A heat exchange device is preferably used in the third process.

(Fourth Process)

The fourth process is preferably a process in which the water including volatile organic compound in a highly concentrated state and obtained in the second process, is separated into the volatile organic compound and water. In the separating process, a distillation device, a film-separating device, a centrifugal separator, or the like can be applied. The separated water including the volatile organic compound in the second process includes the volatile organic compound in a very high concentration. Therefore, the volume of water provided to the separating process is made to be small. Accordingly, the amount of water which is subjected to the separating process is made to be small, and therefore, less energy is used in the separating process.

In the fourth process, the water including a high concentration of the volatile organic compound does not have to be separated into the volatile organic compound and the water. If there is a facility where the water including the volatile organic compound in a highly concentrated state can be used as it is, the water including a high concentration of the volatile organic compound is provided to the facility.

(Fifth Process)

The fifth process is a process in which the separated water obtained at the fourth process is provided to the first process. The separated water obtained in the fourth process is used as the water which is made to contact the exhaust gas in the first process. In the first process, additional water is supplied when needed.

(Sixth Process)

The sixth process is a process in which the separated volatile organic compound obtained in the fourth process is provided to a facility where the volatile organic compound is needed. The separated volatile organic compound obtained in the fourth process is temporarily stored in a tank or the like, if needed. Thereafter, the separated volatile organic compound stored in the tank can be sent to a facility where the volatile organic compound is needed. For example, the separated volatile organic compound stored in the tank may be sent back to a source which discharges the exhaust gas which is supplied to the first process. Also, the volatile organic compound which is separated and recovered in the fourth process can be used as a raw material of the volatile organic compound itself. Further, the volatile organic compound can be used as a fuel substitute for heavy oil and the like.

(Seventh Process)

The seventh process is a process in which water, which is generated after the cold of the ice is used in the third process, is provided to the first process. The ice generated in the second process is composed of the substantially pure water, i.e., only a very small amount of the volatile organic compound is captured in the ice crystal grains and the ice crystal aggregates, or the like. Accordingly, the water, which is generated from the ice after the cold thereof is used in the third process, includes a very slight amount of the volatile organic compound. However, even if the water includes a very slight amount of the volatile organic compound, no problems arise because the water including the very slight amount of the volatile organic compound is used as the water for contacting the gas including the volatile organic compound gas.

(Other Processes)

If, the water, which is generated from the ice after the cold thereof is used in the third process, is provided to a waste water processing facility, and the volatile organic compound is decomposed by microorganisms in water such as anaerobic bacteria or the like, and the concentration of the volatile organic compound, the COD value and the BOD value of the processed water are brought within an allowable level, the water which has been subjected to this process may be discharged to the exterior of the factory.

Exhaust Gas Recovery Apparatus

Next, a preferred embodiment of the exhaust gas recovery apparatus of the present invention will be described.

FIG. 1 is a schematic structural view illustrating one preferred embodiment of a exhaust gas recovery apparatus of the present invention. In FIG. 1, numeral 10 indicates a solvent exhaust gas discharging source. The solvent exhaust gas discharging source is, for example, a factory where the solvent is used.

The solvent exhaust gas discharging source is connected to a scrubber 14 via a gas passage 12. A spray tower, a cyclone scrubber, a venturi scrubber, a taizen washer, or another device can be used as the scrubber 14. In FIG. 1, a spray tower is shown. Accordingly, hereinafter, numeral 14 donates the spray tower. A lower portion of the spray tower 14 is connected to a freezing and concentrating device 18 via piping 16.

The freezing and enrichment device 18 includes a heat exchange device; an ice making machine in which an aqueous solution is cooled by the heat exchange device and a suspension including ice crystal grains is generated; and a device in which a water is separated from the obtained suspension, the separated water is discharged so as to make the ice crystal grains have a high concentration of the volatility organic compound, and the ice crystal grains are grown so as to generate ice grain aggregates.

The device in which the water is separated from the suspension in the freezing and concentrating device 18 is connected to a lower portion of a distiller device 22 via piping 20. A top portion of the distiller device 22 is connected to a tank 26 via a heat exchanging device 24. The lower portion of the distiller device 22 is connected to the lower portion of the spray tower 14 via piping 28 and piping 30.

The device in which the ice grain aggregates are generated in the freezing and concentrating device 18 is connected to an ice storing tank 32 which is additionally provided at the freezing and concentrating device 18, via a piping 34. The ice storing tank 32 is connected to the lower portion of the spray tower 14 via piping 30 and a heat exchanging device 36.

Next, operation of the exhaust gas recovery apparatus device structured as above will be described.

Exhaust gas including a solvent generated in the solvent exhaust gas discharging source 10 is introduced into the spray tower 14 via the gas passage 12. The exhaust gas is introduced into an inner side of the tower from the lower portion of the spray tower 14. The exhaust gas efficiently contacts water drops sprayed from the top portion of the spray tower 14. The gaseous solvent in the exhaust gas is absorbed into the water due to the water drops contacting the exhaust gas. The water including the solvent is pooled at the lower portion of the spray tower 14. The exhaust gas, from which the gaseous solvent has been removed, is discharged from the top portion of the spray tower 14.

The water including the solvent, which is pooled at the lower portion of the spray tower 14, is introduced into the freezing and concentrating device 18 via the piping 16. In the freezing and concentrating device 18, the water including the solvent is cooled by the heat exchanging device. A suspension including ice crystal grains is thereby generated. At a temperature at which the heat exchanging device effects cooling, the water freezes but the solvent does not freeze. Accordingly, most of the water becomes ice crystal grain, and the suspension, in which the ice crystal grains are dispersed in a solution comprising a water other than the water which has become the ice crystal grains and a liquid-like solvent, is generated. Next, the ice crystal grains in the suspension are separated from the solution, and the separated ice crystal grains are introduced into the ice storing tank 32 via the piping 32.

On the other hand, the water including a high concentration of solvent is introduced into the distiller device 22 via the piping 22. In the distiller device 22, the water and the solvent are separated from the water including the solvent in the highly concentrated state, by use of the difference between the boiling point of water and the boiling point of the solvent. Here, the heat of the separated solvent is exchanged at the heat exchanging device, 24 and thereafter, the cooled solvent is provided to the tank for storing solvent 26. The solvent stored in the tank for storing solvent 26 is reused as a solvent in the solvent exhaust gas discharging source 10, or is reused at another facility if necessary.

The water discharged from the lower portion of the distiller device 22 is provided to the spray tower 14 via the piping 28 and the piping 30. This water is reused as water for absorbing the solvent in the exhaust gas. The cold of the ice crystal grains and the ice grain aggregates, which are introduced into the ice storage tank 32, is exchanged at the heat exchanging device 32, so as to utilize the cold thereof.

A detailed description will be given below of an example of the present invention. However, the present invention is not limited to the example described below, and covers exhaust gas recovery methods and apparatuses which fall within the scope of the present invention.

EXAMPLE

Methanol was recovered from an exhaust gas containing methanol exhausted from the solvent exhaust gas discharging source 10.

The exhaust gas containing the methanol was introduced into the spray tower 14 at a rate of 2000 Nm$^3$ /min. The amount of methanol contained in the exhaust gas was 500 ppm. When water was sprayed from the top portion of the spray tower 14 and the exhaust gas was introduced into the lower portion of the spray tower 14, the methanol concentration of the water obtained from the spray tower 14 was 5000 ppm.

Next, the water, which was obtained from the spray tower 14 and whose methanol concentration was 5000 ppm, was introduced into the freezing and concentrating device 18 at a rate of 200 T/day, and the freezing and concentrating process was carried out by the freezing and concentrating device 18. As the result, concentrated water, whose methanol content was 90000 ppm, was obtained at a rate of 10 T/day. Also, ice (ice crystal grains and ice grain aggregates), whose methanol content was 200 ppm, was obtained at a rate of 190 T/day.

Next, in the distiller device 22, methanol and water were separated from the concentrated water, whose methanol content was 90000 ppm. As a result, methanol whose concentration was 90 wt %, was recovered at a rate of 1.1 T/day. Also, the ice (ice crystal grains and ice grain aggregates) was stored in the ice storage tank 32 at a rate of 190 T/day. Thereafter, the cold thereof was used (exchanged) at the heat exchanging device 36. The obtained quantity of cold from the ice (ice crystal grains and ice grain aggregates) in the heat exchanging device 36 was 15000 Mcal/day.

Recycled water, which was: (1) the water (190 T/day), which was generated as the result of the cold of the ice being exchanged by the heat exchanging device 36; (2) the water (8.9 T/day), which was separated at the distiller device 22; and (3) supplied water (1.1 T/day), was supplied to the spray tower 14 at a rate of 200 T/day In the active carbon adsorption method, which is a conventional solvent recovery method, it is difficult for methanol to be absorbed by active carbon. Therefore, in a mixed solvent gas system (for example, in a system containing methyl ethyl ketone and methanol), methanol is not absorbed, and is discharged to the atmosphere.

In the exhaust gas recovery method and apparatus therefor of the present invention, a volatile organic compound, such as a solvent, can be efficiently removed from an large amount of exhaust gas including the volatile organic compound. Also, merely water is used in the present invention, and active carbon is not used. The recovered solvent can be reused, and the cold generated at the time of recovery of the volatile organic compound can be reused efficiently. Therefore, the running cost for recovering the volatile organic compound can be reduced.

What is claimed is:

1. An exhaust gas recovery method comprising:
   a first process in which a volatile organic compound gas is absorbed by water;
   a second process in which water including the volatile organic compound, which is obtained in the first process, is frozen and concentrated such that the water including the volatile organic compound is separated into
      water including a high concentration of the volatile organic compound, level of concentration being higher than that of the water including the volatile organic compound which is obtained in the first process, and
      ice;
   a third process in which cold of the ice obtained in the second process is used; and
   a fourth process in which the water including a high concentration of the volatile organic compound, which is obtained in the second process, is reused.

2. An exhaust gas recovery method, according to claim 1, wherein the fourth process is a process in which the water including a high concentration of the volatile organic compound, which is obtained in the second process, is separated into
   the volatile organic compound; and
   water.

3. An exhaust gas recovery method, according to claim 2, further comprising:
   a fifth process in which the separated water obtained in the fourth process is supplied to the first process.

4. An exhaust gas recovery method, according to claim 2, further comprising:
   a sixth process in which the separated volatile organic compound obtained in the fourth process is supplied to a section where the volatile organic compound is needed.

5. An exhaust gas recovery method, according to claim 3, further comprising:
   a sixth process in which the separated volatile organic compound obtained in the fourth process is supplied to a section where the volatile organic compound is needed.

6. An exhaust gas recovery method, according to claim 1, further comprising:
   a seventh process in which water, which is generated due to the cold of the ice being used in the third process, is supplied to the first process.

7. An exhaust gas recovery method, according to claim 5, further comprising:
   a seventh process in which water, which is generated due to the cold of the ice being used in the third process, is supplied to the first process.

8. An exhaust gas recovery method, according to claim 1, wherein the volatile organic compound is an organic solvent.

9. An exhaust gas recovery method, according to claim 7, wherein the volatile organic compound is an organic solvent.

10. An exhaust gas recovery method according to claim 1, wherein the volatile organic compound included in water, which is generated due to the cold of the ice being used in the third process, is decomposed in a waste water processing section.

11. An exhaust gas recovery method according to claim 7, wherein the volatile organic compound included in the water, which is generated due to the cold of the ice being used in the third process, is decomposed in a waste water processing section.

12. An exhaust gas recovery method, according to claim 9, wherein
    the volatile organic compound included in the water, which is generated due to the cold of the ice being used in the third process, is decomposed in a waste water processing section.

13. An exhaust gas recovery apparatus comprising:
    a first section in which a volatile organic compound gas is absorbed by water;
    a second section in which water including the volatile organic compound, which is obtained in the first section, is frozen and concentrated such that the water including the volatile organic compound is separated into
       water including a high concentration of the volatile organic compound, level of concentration being higher than that of the water including the volatile organic compound which is obtained in the first section, and
       ice;
    a third section in which cold of the ice obtained in the second section is used; and
    a fourth section in which the water including a high concentration of the volatile organic compound, which is obtained in the second section, is reused.

14. An exhaust gas recovery apparatus according to claim 13, wherein the first section is a scrubber.

15. An exhaust gas recovery apparatus according to claim 13, wherein the fourth section is a distiller.

16. An exhaust gas recovery apparatus according to claim 14, wherein the fourth section is a distiller.

* * * * *